United States Patent
Bai et al.

(10) Patent No.: US 10,838,428 B2
(45) Date of Patent: Nov. 17, 2020

(54) AUTONOMOUS DROP-OFF AND PICK-UP

(71) Applicant: Honda Motor Co., Ltd., Tokyo (JP)

(72) Inventors: Xue Bai, Novi, MI (US); Ehsan Moradi-Pari, West Bloomfield, MI (US); Samer Rajab, West Bloomfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 275 days.

(21) Appl. No.: 15/825,668

(22) Filed: Nov. 29, 2017

(65) Prior Publication Data

US 2019/0163204 A1 May 30, 2019

(51) Int. Cl.
*G05D 1/02* (2020.01)
*G05D 1/00* (2006.01)
*G08G 1/00* (2006.01)
*G06Q 10/04* (2012.01)

(52) U.S. Cl.
CPC ......... *G05D 1/0278* (2013.01); *G05D 1/0088* (2013.01); *G06Q 10/047* (2013.01); *G08G 1/202* (2013.01); *G05D 2201/0212* (2013.01)

(58) Field of Classification Search
CPC ............. G05D 1/0278; G05D 1/0088; G05D 2201/0212; G06Q 10/047; G08G 1/202
USPC ......................................................... 701/25
See application file for complete search history.

(56) References Cited

U.S. PATENT DOCUMENTS

| | | | |
|---|---|---|---|
| 8,352,111 B2 | 1/2013 | Mudalige | |
| 9,205,805 B2 | 12/2015 | Cudak et al. | |
| 9,377,315 B2 | 6/2016 | Grover et al. | |
| 9,421,972 B2 | 8/2016 | Davidsson et al. | |
| 9,599,482 B2 | 3/2017 | Maise et al. | |
| 9,637,117 B1 | 5/2017 | Gusikhin et al. | |
| 9,733,096 B2 | 8/2017 | Colijn et al. | |
| 2015/0338852 A1 | 11/2015 | Ramanujam | |
| 2015/0346727 A1 | 12/2015 | Ramanujam | |
| 2018/0267536 A1* | 9/2018 | Goldberg | G05D 1/0088 |

* cited by examiner

*Primary Examiner* — Paula L Schneider
(74) *Attorney, Agent, or Firm* — Rnakin, Hill & Clark LLP

(57) ABSTRACT

Systems and techniques for autonomous vehicle drop-off and pick-up of an individual (e.g., valet type operation) are disclosed herein. An autonomous vehicle may receive global positioning system (GPS) location data including a drop-off location, a parking location, a pick-up location, a pick-up time, and timing factor information associated with an estimated arrival of the individual at the pick-up location, determine an adjusted pick-up time associated with the pick-up of the individual based on the timing factor, determine a departure time for autonomous pick-up of the individual based on the adjusted pick-up time, autonomously park the autonomous vehicle, by travelling from the drop-off location to the parking location after drop-off of the individual, and autonomously pick-up the individual, by departing, at the departure time, from the parking location and travelling to the pick-up location.

20 Claims, 6 Drawing Sheets

AUTONOMOUS DROP-OFF AND PICK-UP

BACKGROUND

Autonomous vehicles are vehicles which are generally capable of operating as a driverless vehicle or have some self-driving capabilities. While autonomous vehicles show promise as a future technology, different applications of autonomous driving are still being explored.

BRIEF DESCRIPTION

According to one or more aspects, a system for autonomous vehicle drop-off and pick-up of an individual may include a global positioning system (GPS) unit receiving GPS location data associated with an autonomous vehicle. The GPS unit may receive a drop-off location associated with a drop-off of the individual. The system may include a communication unit receiving a parking location, a pick-up location associated with pick-up of the individual, a pick-up time associated with pick-up of the individual, and a timing factor associated with an estimated arrival of the individual at the pick-up location. The system may include a timing controller determining an adjusted pick-up time associated with the pick-up of the individual based on the timing factor and determining a departure time for the autonomous pick-up of the individual based on the adjusted pick-up time. The system may include an autonomous controller autonomously parking the autonomous vehicle, by travelling from the drop-off location to the parking location after drop-off of the individual and autonomously picking up the individual, by departing, at the departure time, from the parking location and travelling to the pick-up location.

The timing factor associated with arrival of the individual at the pick-up location may be a delay associated with the individual travelling from an activity location to the pick-up location. The timing factor associated with arrival of the individual at the pick-up location may be a premature arrival factor associated with the individual travelling from an activity location to the pick-up location. The timing controller may determine the departure time based on a timing factor associated with travel of the autonomous vehicle from the parking location to the pick-up location. The timing factor associated with travel of the autonomous vehicle may be a delay associated with travel of the autonomous vehicle from the parking location to the pick-up location. The system may include an environment sensor detecting an object in an operating environment and the autonomous controller may navigate the autonomous vehicle around the object in the operating environment. The timing factor may be obtained from a schedule retrieved from a mobile device associated with the individual. The timing controller may determine a suggested alternative pick-up location based on the timing factor associated with arrival of the individual at the pick-up location. The communication unit may receive an activity associated with the individual, and the timing controller may determine the adjusted pick-up time associated with pick-up of the individual based on the activity. The timing controller may infer an activity associated with the individual based on the drop-off location and determine the adjusted pick-up time associated with pick-up of the individual based on the inferred activity.

According to one or more aspects, a system for autonomous vehicle drop-off and pick-up of an individual may include a global positioning system (GPS) unit receiving a drop-off location associated with a drop-off of the individual. The system may include a communication unit receiving a parking location, a pick-up location associated with pick-up of the individual, a pick-up time associated with pick-up of the individual, and a timing factor associated with an estimated arrival of the individual at the pick-up location. The system may include a timing controller determining an adjusted pick-up time associated with the pick-up of the individual based on the timing factor and determining a departure time for the autonomous pick-up of the individual based on the adjusted pick-up time. The system may include an environment sensor detecting an object in an operating environment. The system may include an autonomous controller autonomously parking the autonomous vehicle, by travelling from the drop-off location to the parking location after drop-off of the individual and autonomously picking up the individual, by departing, at the departure time, from the parking location and travelling to the pick-up location. The autonomous controller may navigate the autonomous vehicle around the object in the operating environment.

The timing factor associated with arrival of the individual at the pick-up location may be a delay associated with the individual travelling from an activity location to the pick-up location. The timing factor associated with arrival of the individual at the pick-up location may be a premature arrival factor associated with the individual travelling from an activity location to the pick-up location. The timing controller may determine the departure time based on a timing factor associated with travel of the autonomous vehicle from the parking location to the pick-up location. The timing factor associated with travel of the autonomous vehicle may be a delay associated with travel of the autonomous vehicle from the parking location to the pick-up location. The timing factor may be obtained from a mobile device associated with the individual.

According to one or more aspects, a method for operating an autonomous vehicle to drop-off and pick-up an individual may include receiving global positioning system (GPS) location data including a drop-off location associated with a drop-off of the individual, receiving a parking location, a pick-up location associated with pick-up of the individual, a pick-up time associated with pick-up of the individual, and a timing factor associated with an estimated arrival of the individual at the pick-up location, determining an adjusted pick-up time associated with the pick-up of the individual based on the timing factor, determining a departure time for the autonomous pick-up of the individual based on the adjusted pick-up time, autonomously parking the autonomous vehicle, by travelling from the drop-off location to the parking location after drop-off of the individual, and autonomously picking up the individual, by departing, at the departure time, from the parking location and travelling to the pick-up location.

The method may include determining the departure time based on a timing factor associated with travel of the autonomous vehicle from the parking location to the pick-up location. The timing factor associated with arrival of the individual at the pick-up location may be a delay associated with the individual travelling from an activity location to the pick-up location. The timing factor associated with arrival of the individual at the pick-up location may be a premature arrival factor associated with the individual travelling from an activity location to the pick-up location.

DETAILED DESCRIPTION

Figure 1:
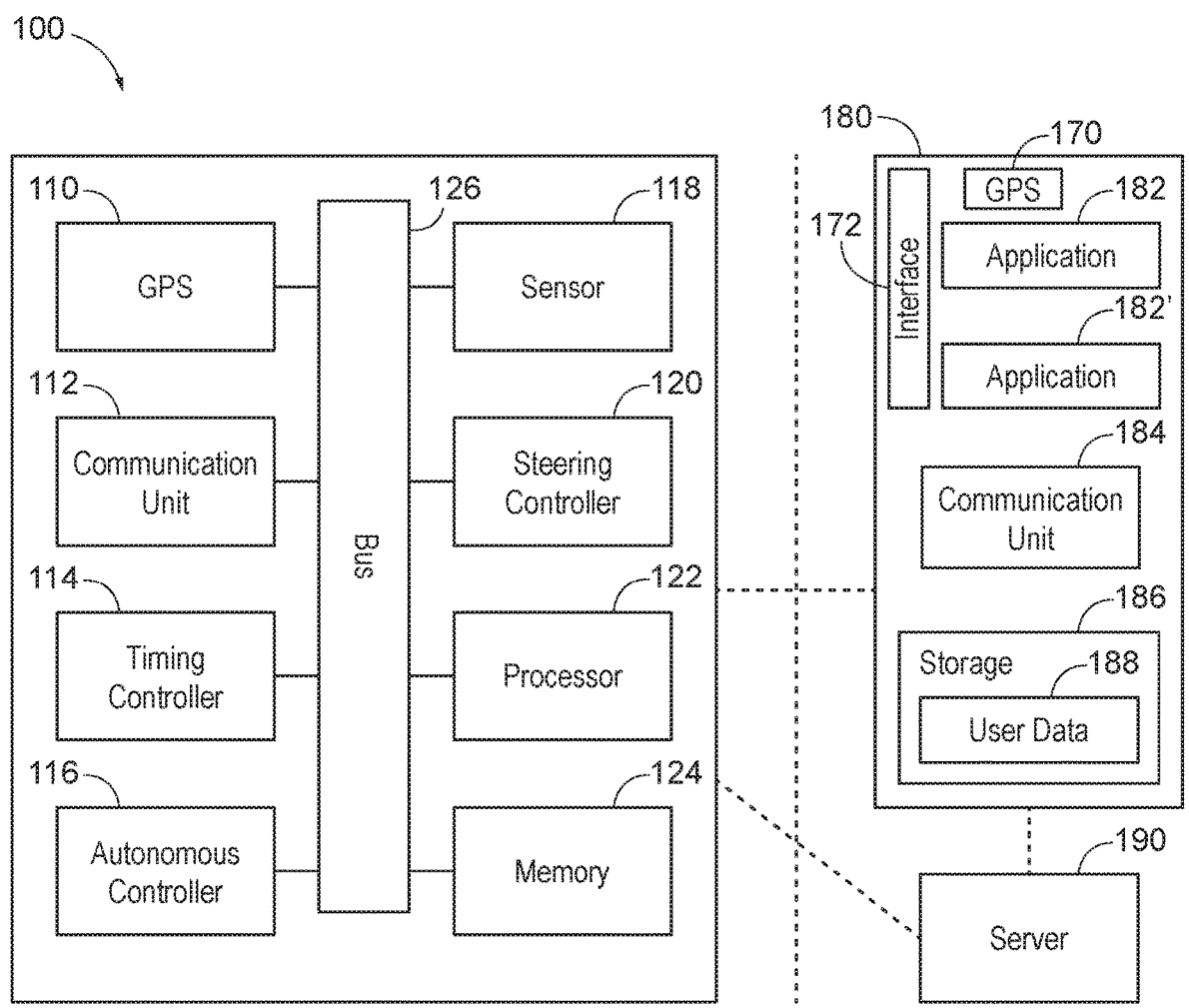
FIG. 1 is an illustration of a component diagram of an exemplary system for autonomous vehicle drop-off and pick-up of an individual, according to one or more aspects.

The following terms are used throughout the disclosure, the definitions of which are provided herein to assist in understanding one or more aspects of the disclosure.

"Vehicle", as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Processor Area network (CAN), Local Interconnect network (LIN), among others.

"Communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Operable connection", or a connection by which entities are "operably connected", is one in which signals, physical communications, and/or logical communications may be sent and/or received. An operable connection may include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Mobile device", as used herein, is a computing device typically having a display screen with user input (e.g., touch, keyboard) and a processor for computing. Mobile devices include, but are not limited to, handheld devices, portable devices, smart phones, laptops, tablets, and e-readers.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of a component diagram of an exemplary system 100 for autonomous vehicle drop-off and pick-up of an individual, according to one or more aspects. The system 100 for autonomous vehicle drop-off and pick-up of the individual may include a global positioning system (GPS) unit 110, a communication unit 112, a timing controller 114, an autonomous controller 116, one or more sensors 118, a steering controller 120, a processor 122, a memory 124, and a bus 126 which interconnects or communicatively couples the aforementioned components, thereby enabling communication therebetween.

The system 100 of FIG. 1 may receive information or otherwise communicate with other systems or devices, such as a mobile device 180. The mobile device 180 may include a GPS unit 170, an interface 172, one or more applications 182, 182', a communication unit 184, a storage disk 186, which may be used to store data 188, such as profile information, other applications, or data associated with other applications, as will be described herein. The system 100 may also communicate with or receive information from a server 190 via the communication unit 112.

Generally, the system 100 of FIG. 1 may be embodied a part of an electronic control unit (ECU), not shown, of an autonomous vehicle. According to one or more aspects, one or more of the timing controller 114, the autonomous controller 116, or the steering controller 120 may be implemented via the processor 122 and/or the memory 124, wherein one or more instructions are stored in the memory 124, which when executed by the processor 122, causes the processor 122 to perform one or more actions, as will be described herein.

The GPS unit 110 may receive GPS location data associated with the autonomous vehicle. This GPS location data may include a current location of the autonomous vehicle, a drop-off location associated with drop-off of the individual or the passenger of the autonomous vehicle, a pick-up location associated with pick-up of the individual or the passenger, or other GPS data. For example, the GPS unit 110 may include a GPS receiver which receives data from GPS satellites and determines the current location of the GPS unit 110 based on the GPS satellite data. Further, the GPS unit 110 may receive one or more navigation instructions from a first (origin) location to a second (destination) location from the server 190. Examples of these locations include the drop-off location, the pick-up location, etc.

The application 182 of the mobile device 180 may indicate to the system 100 that the individual is being dropped off or that the individual is being picked up at a given location. Thus, the GPS unit 110 may receive a drop-off indication or a pick-up indication signal from the application 182 of the mobile device 180 and mark or set the drop-off location or the pick-up location accordingly. In this way, the application 182 may facilitate autonomous valet pick-up and drop-off for the individual utilizing the autonomous vehicle, as will be described in the exemplary scenarios of FIGS. 3-4.

The communication unit 112 may receive one or more destination locations from the application 182 of the mobile device 180 or the server 190. These destination locations may be a location to which the autonomous vehicle will travel at a future time. Examples of destination locations may include a parking location, the (desired or requested) drop-off location, and the pick-up location. The communication unit 112 may include a transmitter and receiver or a transceiver which receives information from the mobile device 180 or the server 190. Additionally, the communication unit 112 may receive requested timing information, such as a (requested) pick-up time associated with pick-up of the individual or a drop-off time associated with drop-off of the individual. For example, the communication unit 112 may include an input/output device, such as a touch screen, keypad, touchpad, or microphone which enables the individual to provide inputs (e.g., the pick-up location, the pick-up time, etc.) to the system 100. Further, the communication unit 112 may include a display which renders an interface for prompting the individual for information such as the pick-up location or time or presenting confirmation of selections to the individual.

Other types of timing information received by the communication unit 112 may include information which may be utilized to derive a timing factor associated with an estimated arrival of the individual at the pick-up location. For example, the timing factor associated with the arrival of the individual at the pick-up location may be indicative of a delay associated with the individual travelling from an activity location, determined or provided by the application 182 of the mobile device 180 or determined based on the drop-off location, to the pick-up location. For example, the application 182 of the mobile device 180 may have access to a schedule or a calendar event from which the timing factor information or activity location may be extracted. Thus, the mobile device 180 may facilitate inference of the activity (or activity location) or provide the activity associated with the individual at the drop-off location. In this way, the communication unit 112 may receive the activity or inferred activity associated with the individual and the timing controller 114 may determine the adjusted pick-up time associated with pick-up of the individual based on the activity or inferred activity.

As another example, the timing factor associated with the arrival of the individual at the pick-up location may be indicative of a premature arrival factor associated with the individual travelling from the activity location to the pick-up location. In other words, the timing factor associated with the arrival of the individual at the pick-up location may be indicative of an inference related to whether or not the individual is expected to be at the requested pick-up location at the agreed pick-up time.

According to one or more aspects, this timing factor associated with the arrival of the individual at the pick-up location, may be based on factors other than a current location of the individual, as provided by the mobile device 180, which may be equipped with its own GPS unit 170. For example, based on the drop-off location, it may be inferred by the timing controller 114, and reflected in the timing factor, that the individual is attending an event or activity. In this way, the activity location may also be inferred. The timing controller 114 may then receive updates for the event from the server 190 or the mobile device 180, and adjust the pick-up time associated with the pick-up of the individual based on the timing factor. In any event, the timing controller 114 may determine an adjusted pick-up time associated with the pick-up of the individual based on the timing factor. Stated another way, the timing controller 114 may infer an activity associated with the individual based on the drop-off location and determine the adjusted pick-up time associated with pick-up of the individual based on the inferred activity.

The autonomous controller 116 may control autonomous operation of the autonomous vehicle, including autonomously driving, autonomously navigating, autonomously parking, autonomously picking up, and autonomously dropping off the individual or one or more passengers or occupants. One or more of the sensors 118 may include an environment sensor which detects an object in an operating environment, thereby enabling the autonomous controller 116 to navigate the autonomous vehicle around the object in the operating environment. Objects in the operating environment may include obstacles (including a red light, stop sign, or other traffic considerations or rules), obstructions, other vehicles, such as cyclists, people, sidewalks, curbs, light posts, trash cans, etc. The autonomous controller 116 may implement an autonomous navigation algorithm or other self-driving algorithm and thereby navigate the vehicle around objects detects by the environment sensor 118. The environment sensor 118 may include light detection and ranging (LIDAR) sensors, a radar sensor, an image capture sensor or camera, or other types of sensors.

Additionally, the autonomous controller 116 may control the autonomous driving or navigation based on satellite information received from the GPS unit 110, map information received from the server 190, or dedicated short range communication (DSRC) information received by the communication unit 112. Using any of this information, the autonomous controller 116 may thus autonomously park the autonomous vehicle, by travelling from the drop-off location to the parking location after drop-off of the individual and/or autonomously pick up the individual, by departing, at the departure time (determined by the timing controller 114), from the parking location and travelling to the pick-up location. As previously noted, the departure time may be determined based on the adjusted pick-up time, which accounts for delays or early arrival of the individual based on inferences that the individual is attending an event or an estimated activity time. Thus, the timing controller 114 may derive or receive the timing factor to account for the estimated arrival time for the individual to travel from the activity location to the pick-up location.

According to one or more aspects, the timing controller 114 may determine a departure time for the autonomous vehicle (e.g., from the parking location to the pick-up location) based on a timing factor associated with travel of the autonomous vehicle from the parking location to the pick-up location. In other words, the timing factor associated with travel of the autonomous vehicle from the parking location to the pick-up location may be indicative of delays which are associated with the vehicle travelling from the parking location to autonomously pick-up the individual, such as traffic or weather delays, for example. The communication unit 112 may receive information related to this timing factor from the server 190, and the timing controller 114 may determine or adjust the departure time accordingly.

The timing controller 114 may suggest one or more alternative pick-up locations based on the timing factor, taking into account the travel of the individual from the activity location to the proposed alternative pick-up location and the travel of the autonomous vehicle from the parking location to the proposed alternative pick-up location. Additionally, the alternative pick-up location may be suggested based on the drop-off location and the inferred activity associated with the individual.

The steering controller 120 may implement vehicle control signals from the autonomous controller 116 and actuate one or more vehicle components (e.g., brakes, throttle, steering, etc.) to thereby autonomously drive the autonomous vehicle from the origin location to the destination location, which may be a desired or requested location.

Figure 2:
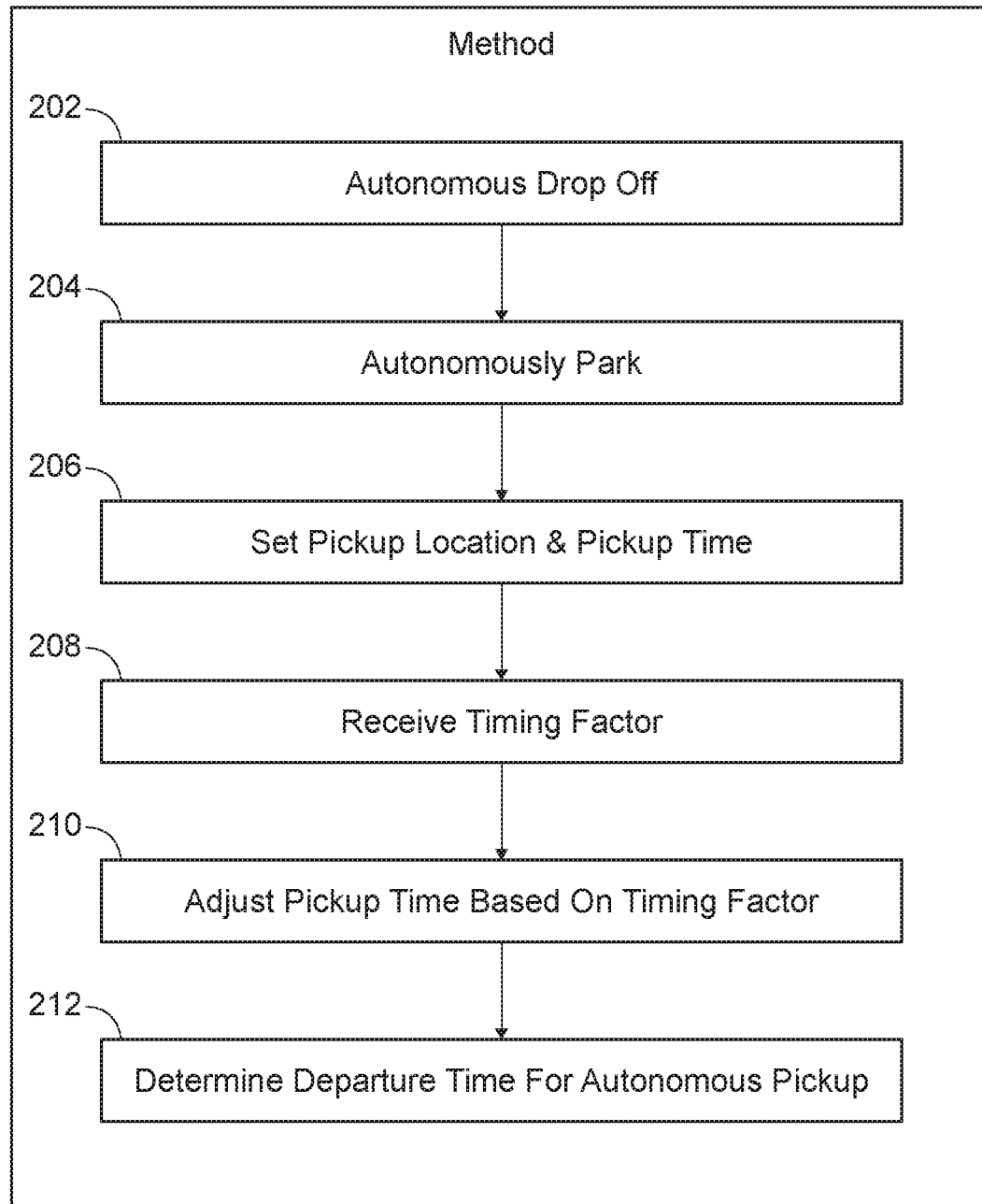
FIG. 2 is an illustration of an example flow diagram of a method for operating an autonomous vehicle to drop-off and pick-up an individual, according to one or more aspects.

FIG. 2 is an illustration of an example flow diagram of a method 200 for operating the autonomous vehicle to drop-off and pick-up the individual, according to one or more aspects. The method 200 for operating the autonomous vehicle may include autonomously dropping off 202 the individual at the drop-off location. This may be done using the application 182 or via the communication unit 112 in the autonomous vehicle to set the drop-off location. The autonomous vehicle may thus travel from a current location, autonomously, and navigate around objects or obstacles, while obeying traffic regulations, to the drop-off location. The drop-off location may be recorded by the GPS unit 110 and stored to the system 100 (e.g., on the memory 124).

Once the autonomous vehicle reaches the drop-off location, and the individual exits the vehicle, the autonomous vehicle may autonomously park 204 itself, by navigating from the drop-off location to a parking location. The parking location may be a predetermined parking location or a parking location determined by the GPS unit 110 on the fly. For example, the parking location may be set by the individual using the communication unit 112 (e.g., entered manually by the individual via the interface 172) or via the application 182 on the mobile device 180, such as during the ride to the drop-off location, prior to the ride, or even as the individual is being dropped off. As another example, the autonomous vehicle may communicate with the server 190 and be assigned, by the server 190, the parking location. In this way, the autonomous vehicle may autonomously park itself.

The individual may set the pick-up location and a corresponding pick-up time 206 using the communication unit 112 or the mobile device 180. If the pick-up location and the pick-up time are set using the mobile device 180, the communication unit 184 of the mobile device 180 may transmit this information to the communication unit 112 of the system 100.

The timing factor or timing factor information may be received 208 by the communication unit 112 from either the server 190 or the mobile device 180. Examples of timing factor information may include an event being attended by the individual, an activity being performed by the individual, etc. The event or activity may be determined or inferred based on the drop-off location (e.g., due to the proximity of the drop-off location to an event, such as a ball game) or imported from the application 182 of the mobile device 180. For example, the mobile device 180 may query a calendar application, email application, or data 188 to infer an activity associated with the individual. Additionally, the event or activity associated with the user may be inferred based on the date and/or time (e.g., drop-off during M-F from 8:00 AM-5:00 PM is associated with the individual attending work).

The timing controller 114 may determine the adjusted pick-up time 210 based on the timing factor, and thus facilitate arrival of the autonomous vehicle and the individual at the pick-up location at nearly the same time. The timing factor may be inferred or learned based on historical trends associated with the individual walking from the activity location to the pick-up location based on distance, number of crosswalks, one or more tasks required of the individual (e.g., clocking out while at work), taking the elevator, etc. The timing factor may be supplemented by real time data associated with the delays or premature arrival. For example, if the individual typically takes five minutes to walk a quarter mile, and the distance from the activity location to the pick-up location is a quarter mile, but includes stairs and/or elevators, the timing controller 114 may adjust the pick-up time based on the wait associated with taking the elevator or the stairs. Other inferences may be drawn by the timing controller 114, such as if the individual generally takes the elevator at work, when that individual is in a different or new environment, it may be inferred that he or she will opt for the elevator, rather than stairs in calculation of the timing factor for the new scenario, for example.

As another example, if the individual works in an office building next to a baseball stadium, the timing controller 114 may determine and/or adjust the pick-up time based on an inference related to whether the individual is attending work or the baseball game. For example, the communication unit 112 may receive confirmation that the individual is attending the baseball game based on schedule information received from the application 182 of the mobile device 180 (e.g., via an email application, a calendar application, a ticket application, etc.). Further, the timing controller 114 may cross reference the current time and/or date to check or determine whether a baseball game is underway or to be played, such as using the server 190. In any event, once the inference that the individual is attending the game or attending work is determined by the timing controller 114, the pick-up time may be adjusted accordingly. In other words, the timing controller 114 may adjust the pick-up time to account for additional crowds or delays when a game is occurring, versus when the individual is merely attending work, even though the same distance may be travelled from the drop-off location to the activity location (e.g., work or the game). The timing factor may be adjusted by the timing controller 114 based on a current location of the individual, as provided by the GPS 170 of the mobile device 180.

According to one or more aspects, the timing factor may be indicative of premature arrival of the individual at the pick-up location based on the GPS location of the individual, as well as other factors, such as a score of the game, the duration of the game, a number of innings or an amount of time remaining, or a likelihood that a lead change may occur, etc. In other words, the timing factor may be a premature arrival factor associated with the individual travelling from an activity location to the pick-up location at a time earlier than the pick-up time due to factors related to the event or activity (e.g., the score of the game is not close). In this regard, if the individual is attending a baseball game, and the score is 10-0 in the seventh inning, the timing factor may be adjusted to account for an anticipated early exit from the event for the individual and/or a lower amount of people exiting at the end of the game due to other people leaving early as well.

After the adjusted pick-up time is determined (e.g., the time at which the individual is estimated to arrive at the pick-up location, accounting for delays or premature arrival of the individual), the departure time is determined 212 for autonomous pick-up of the individual such that the arrival time of the autonomous vehicle is synchronized with the arrival of the individual at the pick-up location. In this way, the system 100 and method 200 for autonomous vehicle drop-off and pick-up of the individual may enable operation of the autonomous vehicle to account for both delays (or premature arrival) associated with the travel of the vehicle to the pick-up location and delays (or premature arrival) associated with the travel of the individual to the pick-up location.

According to one or more aspects, the timing controller 114 may suggest a change to the pick-up time, notifying the individual that exiting during the seventh inning would save fifteen minutes in drive time, for example. This notification may be transmitted by the communication unit 112 to the mobile device 180, and rendered as a visual or audio notification by the application 182 of the mobile device 180 on the interface 172 of the mobile device 180. In this way, the timing controller 114 may suggest alternative pick-up times and/or locations based on aspects related to the activity of the event at which the individual is attending.

Figure 3:
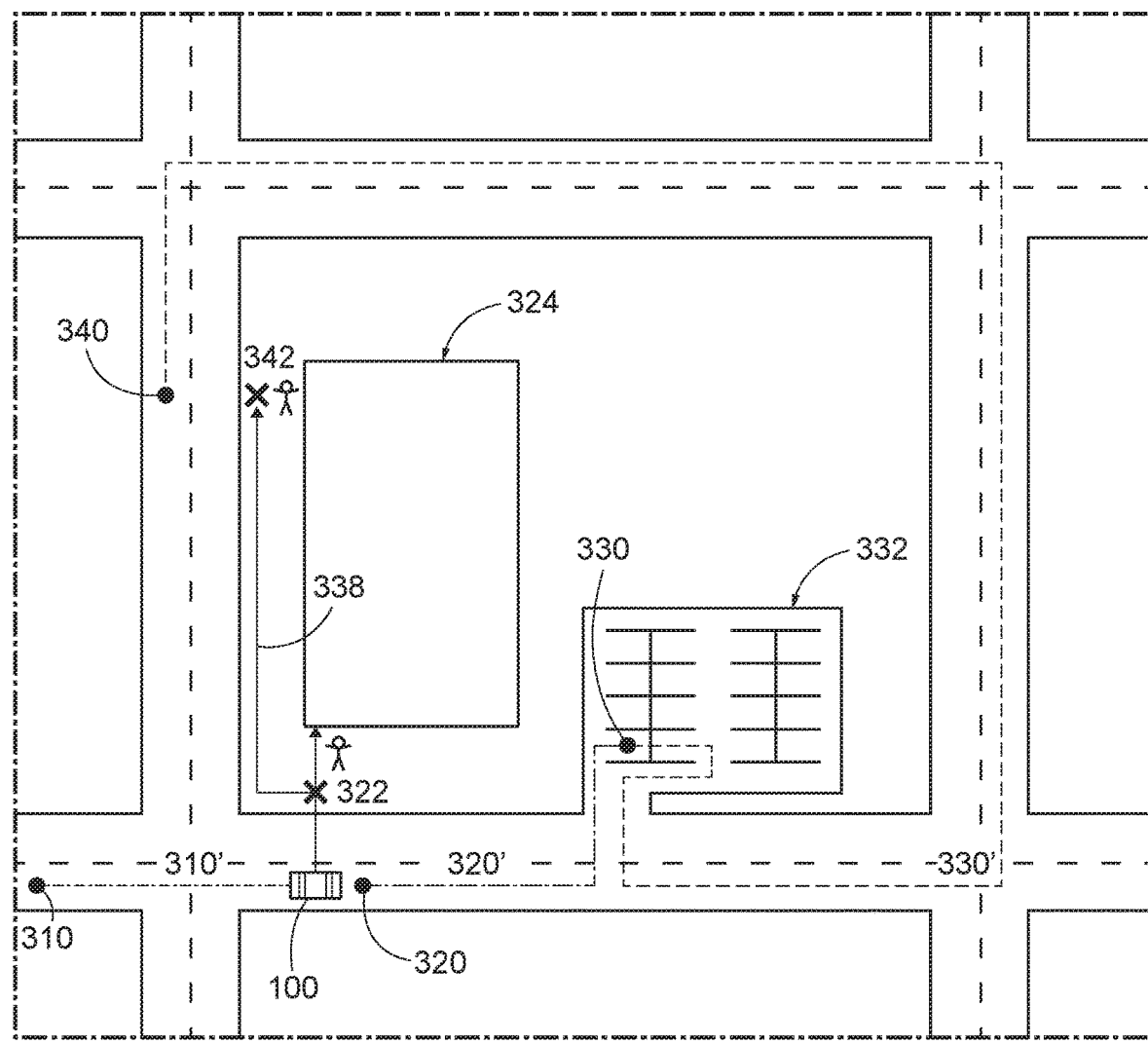
FIG. 3 is an illustration of an exemplary drop-off and pick-up scenario using the system of FIG. 1.

FIG. 3 is an illustration of an exemplary drop-off and pick-up scenario using the system 100 of FIG. 1. At 310, the individual at an origin location, headed toward a drop-off location 320. The autonomous vehicle 100 travels along route 310' and drives autonomously, navigating around objects or obstacles detected by the sensor 118. At 320, the autonomous vehicle 100 stops, and drops off the individual, who crosses the street and enters a building 324. The communication unit 112 of the system 100 may receive timing factor information and the timing controller 114 may infer or determine an event or activity associated with the user. For example, if the individual is working out at the gym (e.g., 324 is the gym), this may be inferred based on the drop-off location, and referenced using the server 190. The timing controller 114 may receive historical timing factor information from the mobile device 180 (e.g., the individual has never finished a workout in less than an hour), and adjust the pick-up time accordingly.

In the meantime, the autonomous vehicle 100 may navigate 320' to a parking location 330 at a parking lot 332. Based on the adjusted pick-up time, the timing controller 114 may determine the departure time for the autonomous vehicle 100. At the departure time, the autonomous vehicle 100 may autonomously navigate 330' from the parking location 330 to the pick-up location 340. According to one or more aspects, in a scenario where the pick-up time or adjusted pick-up time may be ambiguous (e.g., because it is unclear when the individual's workout will be complete), the autonomous vehicle 100 may circle the block in a 'holding pattern' at the departure time. Further, based on the GPS location of the individual, the pick-up location may be adjusted, such as from 342 to 322, based on the location of the autonomous vehicle within the 'holding pattern', the location of the individual, and current traffic conditions. In this scenario, the timing controller 114 may generate the proposed or alternative suggested pick-up location, the communication unit 112 may transmit this suggestion to the mobile device 180, and the application 182 may render the notification for the individual using the interface 172, who may accept or decline the proposed suggestion.

Figure 4:
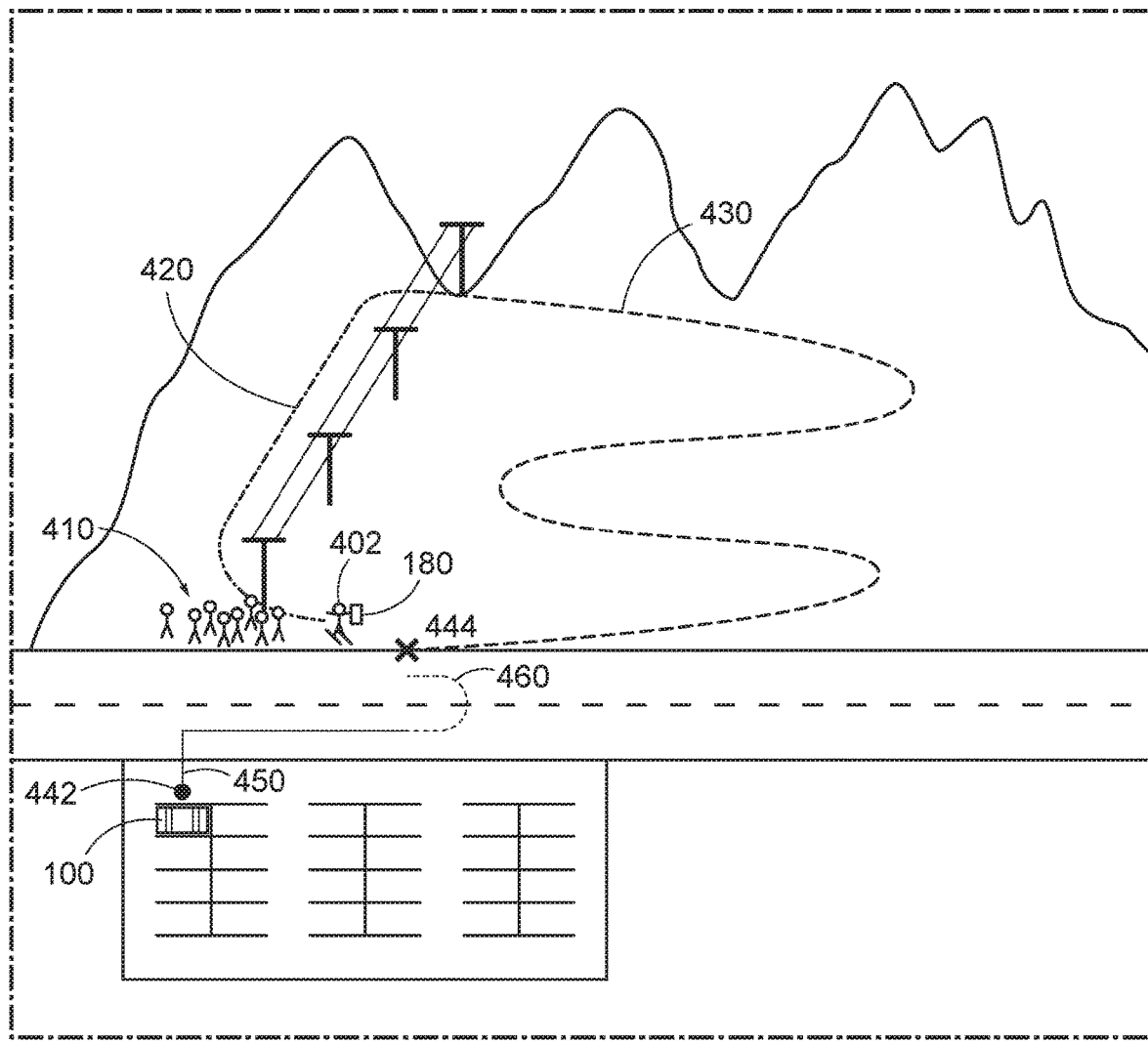
FIG. 4 is an illustration of an exemplary drop-off and pick-up scenario using the system of FIG. 1.

FIG. 4 is an illustration of an exemplary drop-off and pick-up scenario using the system 100 of FIG. 1. In FIG. 4, the individual may have multiple applications (182, 182') installed on the mobile device 180 which may share data or information cross-applications. For example, the individual 402 may indicate, using the application 182 associated with autonomous vehicle drop-off and pick-up, that he or she is making one last run at a ski resort and desires that the autonomous vehicle 100 be ready for autonomous pick-up at the end of his or her ski run. In this scenario, the autonomous vehicle 100 is parked at 442 and would merely travel 450 to 444 to autonomously pick-up the individual 402. However, because there is a delay (e.g., timing factor delay) associated with the crowd 410 of people waiting in line for the ski lift 420 to the top of the mountain, the timing controller 114 may receive timing factor information from a ski application of the mobile device 180 or the server 190 indicative of the lift time.

Further, timing factor information associated with an estimated amount of time a path 430 from the top of the ski run to the pick-up point may be received (e.g., from the ski application or the server 190) or estimated. Based on this timing factor information, the timing controller 114 may determine the departure time for the autonomous vehicle, and command the steering controller 120 to autonomously navigate to the pick-up location accordingly. Further, in this scenario, the communication unit 112 may infer that the activity or the event is skiing (e.g., based on the drop-off location being associated with a ski resort, based on data from the server 190, a calendar appointment or email, or execution of the ski application). In this regard, the autonomous controller 116 may generate a navigation route 460 which causes the autonomous vehicle to pick-up the individual on the same side of the road as the pick-up location 444.

While FIG. 4 is described with reference to delays associated with a ski excursion, it shall be appreciated that other types of delays are considered, such as amusement parks, movies, shopping malls, train stations, classes, etc. Therefore, the systems and techniques described herein enable delays or early arrival of the user to be factored into the pick-up time for the autonomous vehicle pick-up, as well as delays associated with the vehicle traveling from the parking location to the pick-up location.

Figure 5:
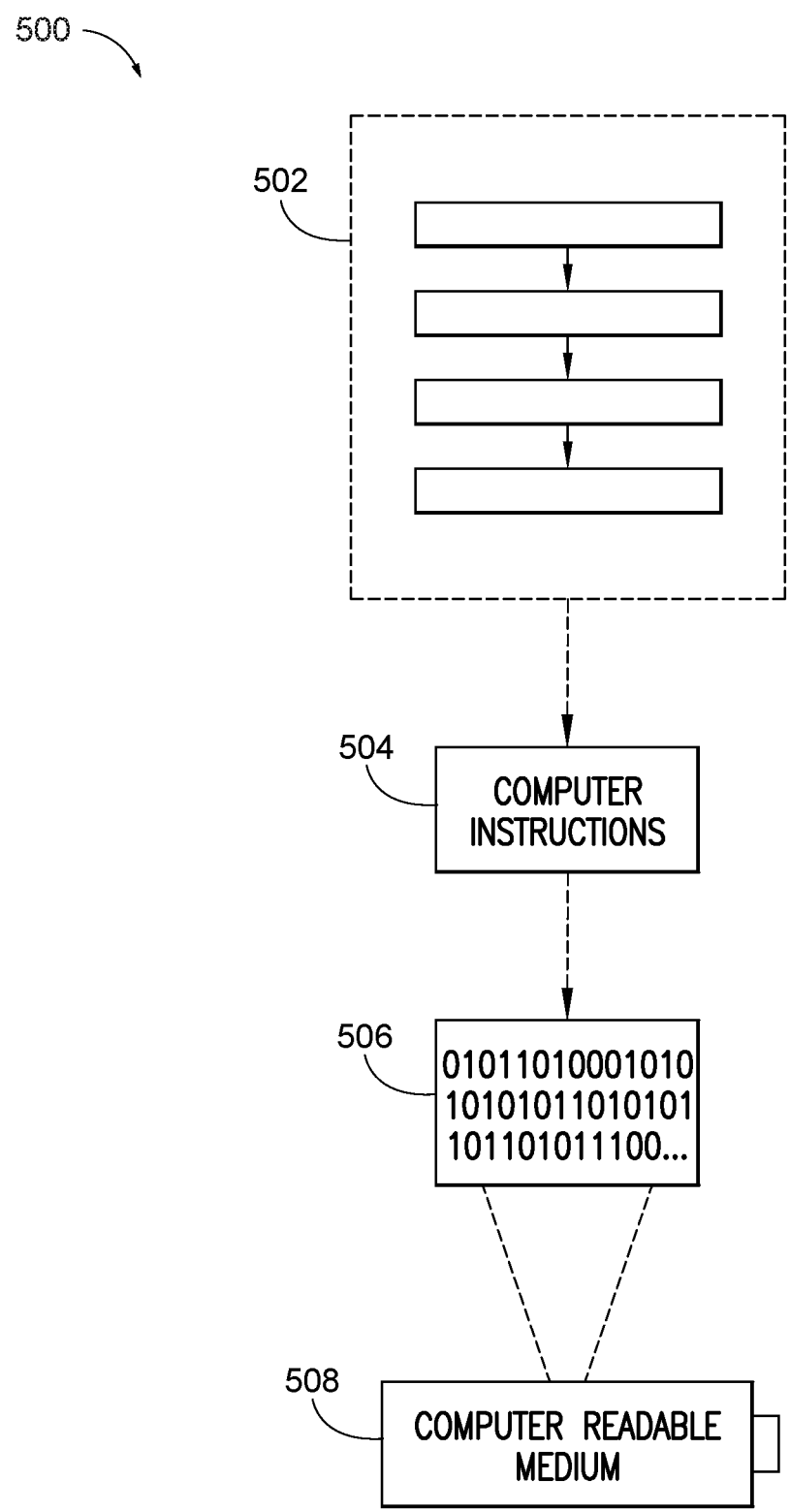
FIG. 5 is an illustration of an example computer-readable medium or computer-readable device including processor-executable instructions configured to embody one or more of the provisions set forth herein, according to one or more aspects.

Still another embodiment involves a computer-readable medium including processor-executable instructions configured to implement one or more aspects of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 200 of FIG. 2. In another embodiment, the processor-executable instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
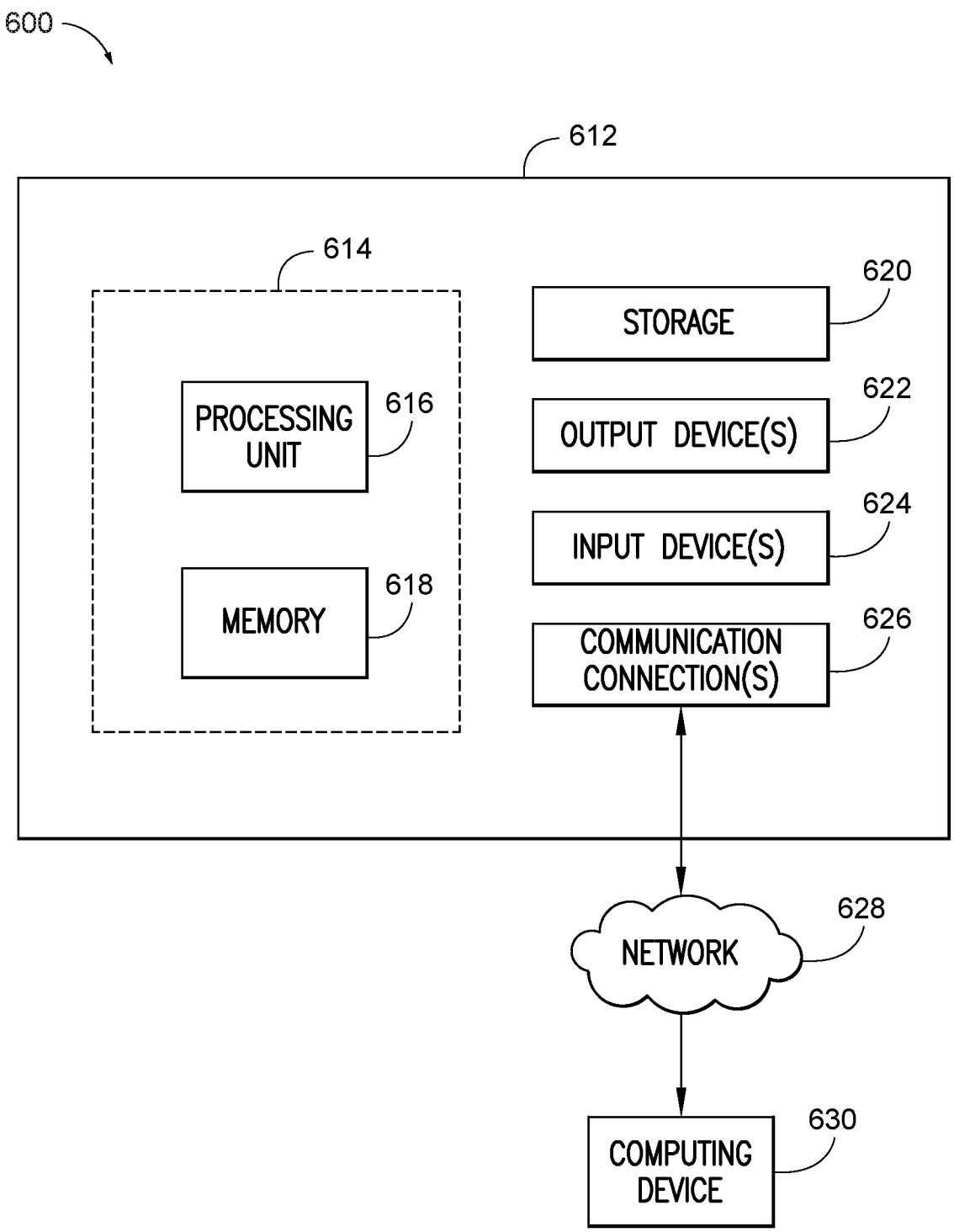
FIG. 6 is an illustration of an example computing environment where one or more of the provisions set forth herein are implemented, according to one or more aspects.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more aspects provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614. The processing unit 616 may process signals, perform general computing and arithmetic functions.

Signals processed by the processing unit 616 may include digital signals, data signals, computer instructions, processor instructions, messages, a bit, a bit stream, that may be received, transmitted, and/or detected. Generally, the processing unit 616 may be a variety of various processors including multiple single and multicore processors and co-processors and other multiple single and multicore processor and co-processor architectures. The processing unit 616 may include circuitry to execute actions and/or algorithms.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more aspects, computer readable instructions to implement one or more aspects provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more aspects, an input device or an output device from another computing device may be used as input device(s) 624 or output device(s) 622 for computing device 612. Device 612 may include communication connection(s) 626 to facilitate communications with one or more other devices 630, such as through network 628, for example.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for autonomous vehicle drop-off and pick-up of an individual, comprising:
    a global positioning system (GPS) unit receiving GPS location data associated with an autonomous vehicle, wherein the GPS unit receives a drop-off location associated with a drop-off of the individual;
    a communication unit receiving a parking location, a pick-up location associated with pick-up of the individual, a pick-up time associated with pick-up of the individual, and a first timing factor associated with an estimated arrival of the individual at the pick-up location and a second timing factor,
    wherein the first timing factor is determined based on the manual execution of a secondary application on a mobile device, wherein the secondary application is not directed to autonomous vehicle drop-off and pick-up of the individual;
    a timing controller:
    determining an adjusted pick-up time associated with the pick-up of the individual based on the first timing factor and the second timing factor; and
    determining a departure time for the autonomous pick-up of the individual based on the adjusted pick-up time; and
    an autonomous controller:
    autonomously parking the autonomous vehicle, by travelling from the drop-off location to the parking location after drop-off of the individual; and
    autonomously picking up the individual, by departing, at the departure time, from the parking location and travelling to the pick-up location.

2. The system of claim 1, wherein the second timing factor associated with arrival of the individual at the pick-up location is a delay associated with the individual travelling from an activity location to the pick-up location.

3. The system of claim 1, wherein the second timing factor associated with arrival of the individual at the pick-up location is a premature arrival factor associated with the individual travelling from an activity location to the pick-up location.

4. The system of claim 1, wherein the timing controller determines the departure time based on the second timing factor associated with travel of the autonomous vehicle from the parking location to the pick-up location.

5. The system of claim 4, wherein the second timing factor associated with travel of the autonomous vehicle is a delay associated with travel of the autonomous vehicle from the parking location to the pick-up location.

6. The system of claim 1, comprising an environment sensor detecting an object in an operating environment, wherein the autonomous controller navigates the autonomous vehicle around the object in the operating environment.

7. The system of claim 1, wherein the second timing factor is obtained from a schedule retrieved from a mobile device associated with the individual.

8. The system of claim 1, wherein the timing controller determines a suggested alternative pick-up location based on the second timing factor associated with arrival of the individual at the pick-up location.

9. The system of claim 1, wherein the communication unit receives an activity associated with the individual, and wherein the timing controller determines the adjusted pick-up time associated with pick-up of the individual based on the activity.

10. The system of claim 1, wherein the timing controller:
    infers an activity associated with the individual based on the drop-off location; and
    determines the adjusted pick-up time associated with pick-up of the individual based on the inferred activity.

11. A system for autonomous vehicle drop-off and pick-up of an individual, comprising:
    a global positioning system (GPS) unit receiving a drop-off location associated with a drop-off of the individual;
    a communication unit receiving a parking location, a pick-up location associated with pick-up of the individual, a pick-up time associated with pick-up of the individual, and a first timing factor associated with an estimated arrival of the individual at the pick-up location and a second timing factor,
    wherein the first timing factor is determined based on the manual execution of a secondary application on a mobile device, wherein the secondary application is not directed to autonomous vehicle drop-off and pick-up of the individual;
    a timing controller:
    determining an adjusted pick-up time associated with the pick-up of the individual based on the first timing factor and the second timing factor; and
    determining a departure time for the autonomous pick-up of the individual based on the adjusted pick-up time;
    an environment sensor detecting an object in an operating environment; and
    an autonomous controller:
    autonomously parking the autonomous vehicle, by travelling from the drop-off location to the parking location after drop-off of the individual; and
    autonomously picking up the individual, by departing, at the departure time, from the parking location and travelling to the pick-up location, wherein the autonomous controller navigates the autonomous vehicle around the object in the operating environment.

12. The system of claim 11, wherein the second timing factor associated with arrival of the individual at the pick-up location is a delay associated with the individual travelling from an activity location to the pick-up location.

13. The system of claim 11, wherein the second timing factor associated with arrival of the individual at the pick-up location is a premature arrival factor associated with the individual travelling from an activity location to the pick-up location.

14. The system of claim 11, wherein the timing controller determines the departure time based on the second timing factor associated with travel of the autonomous vehicle from the parking location to the pick-up location.

15. The system of claim 14, wherein the second timing factor associated with travel of the autonomous vehicle is a delay associated with travel of the autonomous vehicle from the parking location to the pick-up location.

16. The system of claim 11, wherein the second timing factor is obtained from a mobile device associated with the individual.

17. A method for operating an autonomous vehicle to drop-off and pick-up an individual, comprising:
receiving global positioning system (GPS) location data including a drop-off location associated with a drop-off of the individual;
receiving a parking location, a pick-up location associated with pick-up of the individual, a pick-up time associated with pick-up of the individual, and a first timing factor associated with an estimated arrival of the individual at the pick-up location and a second timing factor,
wherein the first timing factor is determined based on the manual execution of a secondary application on a mobile device, wherein the secondary application is not directed to autonomous vehicle drop-off and pick-up of the individual;
determining an adjusted pick-up time associated with the pick-up of the individual based on the first timing factor and the second timing factor;
determining a departure time for the autonomous pick-up of the individual based on the adjusted pick-up time;
autonomously parking the autonomous vehicle, by travelling from the drop-off location to the parking location after drop-off of the individual; and
autonomously picking up the individual, by departing, at the departure time, from the parking location and travelling to the pick-up location.

18. The method of claim 17, wherein the second timing factor associated with arrival of the individual at the pick-up location is a delay associated with the individual travelling from an activity location to the pick-up location.

19. The method of claim 17, wherein the second timing factor associated with arrival of the individual at the pick-up location is a premature arrival factor associated with the individual travelling from an activity location to the pick-up location.

20. The method of claim 17, comprising determining the departure time based on the second timing factor associated with travel of the autonomous vehicle from the parking location to the pick-up location.

* * * * *